United States Patent
Hnatiw et al.

(10) Patent No.: US 7,426,347 B2
(45) Date of Patent: Sep. 16, 2008

(54) SHARED OPTICAL PERFORMANCE MONITORING

(75) Inventors: Alan Hnatiw, Stittsville (CA); Sheldon Walklin, Stittsville (CA); Thomas Ducellier, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 475 days.

(21) Appl. No.: 11/181,946

(22) Filed: Jul. 15, 2005

(65) Prior Publication Data

US 2006/0013585 A1    Jan. 19, 2006

Related U.S. Application Data

(60) Provisional application No. 60/587,934, filed on Jul. 15, 2004.

(51) Int. Cl.
*H04B 10/08* (2006.01)

(52) U.S. Cl. .............................. 398/38; 398/33; 398/79; 398/177; 398/30; 398/31; 398/25; 398/26; 398/27; 398/34; 398/45; 398/48; 398/10; 398/12; 398/13; 398/14; 398/17; 398/19; 398/181; 398/82; 398/83; 398/85; 385/24; 385/16; 385/17; 385/18; 709/224

(58) Field of Classification Search .................... 398/33, 398/38, 79, 177, 30, 83, 82, 48, 85, 45, 50, 398/56, 25, 26, 27, 16, 17, 19, 31, 34, 10, 398/12, 13, 181, 14; 709/224; 385/24, 16, 385/17, 18, 37
See application file for complete search history.

(56) References Cited

U.S. PATENT DOCUMENTS

| | | | | |
|---|---|---|---|---|
| 6,236,478 | B1 * | 5/2001 | Stoll | 398/27 |
| 6,433,901 | B2 * | 8/2002 | Cao | 398/28 |
| 7,231,107 | B1 * | 6/2007 | Zhong et al. | 385/24 |
| 7,254,327 | B1 * | 8/2007 | Zhong et al. | 398/33 |
| 7,308,197 | B1 * | 12/2007 | Zhong et al. | 398/48 |
| 2002/0141009 | A1 | 10/2002 | Yu et al. | |
| 2002/0196430 | A1 | 12/2002 | May et al. | |
| 2004/0096212 | A1 * | 5/2004 | McLeod et al. | 398/25 |

FOREIGN PATENT DOCUMENTS

| | | |
|---|---|---|
| CA | 2341545 A1 | 3/2000 |
| CA | 2374685 AA | 11/2000 |
| CA | 2442375 AA | 3/2004 |
| EP | 1 235 062 A1 | 8/2002 |

* cited by examiner

*Primary Examiner*—Hanh Phan
(74) *Attorney, Agent, or Firm*—Teitelbaum & MacLean; Neil Teitelbaum; Doug MacLean

(57) ABSTRACT

An apparatus for shared optical performance monitoring (OPM) is provided. A wavelength sensitive device receives light at an input port and routes it wavelength selectively to a set of output ports. To perform optical performance monitoring on the output ports, a monitoring component of each output signal is extracted, and these monitoring components are then combined. A single OPM function is then performed on the combined signal. However, with knowledge of the wavelengths that were included in each output signal, a virtual OPM function can be realized for each output port. The per port functionality can include total power per port, power per wavelength per port, variable optical attentuation, dynamic gain equalization, the latter two examples requiring feedback.

39 Claims, 10 Drawing Sheets

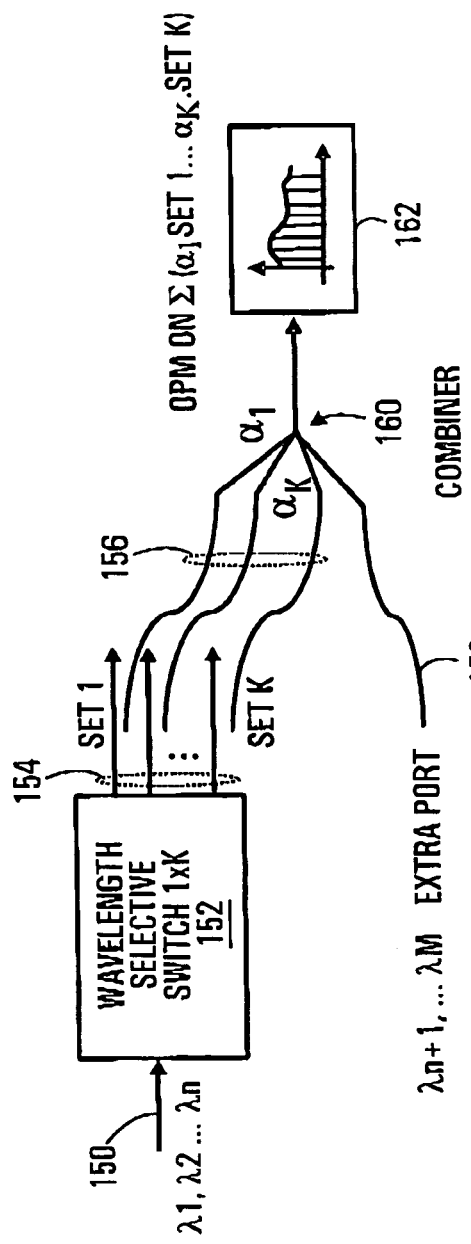

SHARED OPTICAL PERFORMANCE MONITORING

RELATED APPLICATION

This application claims the benefit of U.S. Provisional Application No. 60/587,934 filed Jul. 15, 2004.

FIELD OF THE INVENTION

The invention relates to performance monitoring for wavelength selective switches.

BACKGROUND OF THE INVENTION

Wavelength selective switches have one or more input ports and are capable of routing each of a number of wavelengths on the input ports to an output port selected for that wavelength. Reconfigurable add/drop multiplexers have one or more input ports, one or more output ports and can add and/or drop wavelengths before producing signals at the output ports.

In some cases, an attenuation function is implemented on one or more wavelengths.

In general, it is useful to have optical performance monitoring at the output of such devices to verify switching precision and/or attenuation accuracy, and in some cases to allow feedback functions to be performed. The conventional way to perform optical performance monitoring is to put a monitor on each output port so as to allow an immediate determination of the transfer function between the input and that output port. For a large number of output ports, in order to monitor all output ports, multiple instances of the optical performance monitoring equipment is required, or the equipment needs to be disconnected from each port and connected to each other port in sequence for example with an optical switch. These two approaches are either very expensive or time consuming and tedious. Also, if closed loop feedback is to be performed, there would be the necessity for a respective optical performance monitor per port.

SUMMARY OF THE INVENTION

According to one broad aspect, the invention provides an optical monitoring apparatus comprising: at least two optical monitoring input ports each to receive a respective set of incoming wavelengths; an optical combiner to combine light received at the monitoring input ports into a combined monitoring signal; a wavelength sensitive power monitoring device to determine a power measurement per wavelength of the combined monitoring signal; and a power measurement processor adapted to process the power measurements to produce per-monitoring input port information.

According to another broad aspect, the invention provides an apparatus comprising: at least one input port, wherein a respective optical signal containing at least one wavelength is receivable at each input port; a first wavelength sensitive device to separate the wavelengths received at the at least one input port into at least two output signals containing non-overlapping subsets of wavelengths; an optical combiner to combine at least two of the output signals or monitoring components of at least two of the output signals to produce a monitoring signal; and a wavelength sensitive power monitoring device optically connected to receive the monitoring signal.

According to another broad aspect, the invention provides a tap and continue arrangement comprising: a plurality of waveguides carrying signals to be monitored; a crossing waveguide that crosses the plurality of waveguides so as to couple a small fraction of each signal to be monitored into the crossing waveguide.

According to another broad aspect, the invention provides an apparatus comprising: a wavelength selective switch adapted to couple an input signal to a first plurality of output ports 1 to K with diffractive elements working at a main diffraction order and to couple the input signal to a second plurality of output ports 1' to K' at another diffraction order with low efficiency, wherein the first set of output ports and the second set of output ports are arranged such that coupling from the input to the second output port i is related by a predetermined and fixed relationship to the coupling from the input to the corresponding first output port i for each given wavelength.

According to another broad aspect, the invention provides an apparatus comprising: at least one first port and at least one second port; a wavelength sensitive device operable in a first mode to route wavelengths of a signal received at the at least one first port to the at least one second port, and operable in a second mode to route wavelengths of a signal received at the at least one second port to the at least one first port; directional optical taps on the at least one first port and the at least one second port configured such that in the first mode, monitoring component(s) are produced by the tap(s) on the at least one second port, and in the second mode the monitoring component(s) are produced by the tap(s) on the at least one first port; an optical combiner to combine the monitoring components to produce a monitoring signal; a wavelength sensitive power monitoring device optically connected to receive the overall monitoring signal.

According to another broad aspect, the invention provides a method of performing optical performance monitoring comprising: receiving a plurality of monitoring components; combining the monitoring components into a combined monitoring signal; determining a power measurement per wavelength of the combined monitoring signal; and processing the power measurements to produce per-monitoring component information.

According to another broad aspect, the invention provides a method comprising: receiving at least one optical signal, each optical signal containing at least one wavelength; separating the wavelengths received in the at least one optical signals into at least two output signals containing non-overlapping subsets of wavelengths; combining at least two of the output signals or monitoring components of at least two of the output signals to produce a monitoring signal; and performing optical performance monitoring on the monitoring signal.

In some embodiments, the method further comprises receiving a self-test input for inputting a test signal.

In some embodiments, performing optical performance monitoring comprises producing per output signal information, the method further comprising generating feedback control signals as a function of the power measurements compared to known self-test input.

In some embodiments, performing optical performance monitoring comprises processing the power measurements to produce per output signal information, and to perform calibration of a wavelength sensitive device as a function of the power measurements compared to known self-test input.

In some embodiments, performing optical performance monitoring on the monitoring signal comprises determining a power measurement per wavelength, the method further comprising processing the power measurements to produce per output signal information.

In some embodiments, processing comprises determining a total power of a particular output signal according to a wavelength map of incoming wavelengths included in the particular output by summing power measurements of wavelengths included in that output signal.

In some embodiments, the optical signals are lower diffraction order outputs of a wavelength sensitive device.

In some embodiments, the method further comprises: attenuating each wavelength by a respective amount; as a function of per port wavelength measurements, feeding back a control signal to impose a predetermined attenuation profile with respect to wavelength for each output signal.

In some embodiments, the method further comprises: attenuating each output signal by a respective amount; as a function of per port total power measurements, feeding back a control signal to control the attenuation applied to each output signal.

BRIEF DESCRIPTION OF THE DRAWINGS

Preferred embodiments of the invention will now be described with reference to the attached drawings in which:

FIG. 8 is a block diagram of another embodiment of the invention in which additional ports not connected to the wavelength selective switch are also input to the combiner;

FIG. 9 is a block diagram of another embodiment of the invention in which at least one signal output by the WSS is subject to further processing;

DETAILED DESCRIPTION OF THE PREFERRED EMBODIMENTS

Figure 1:
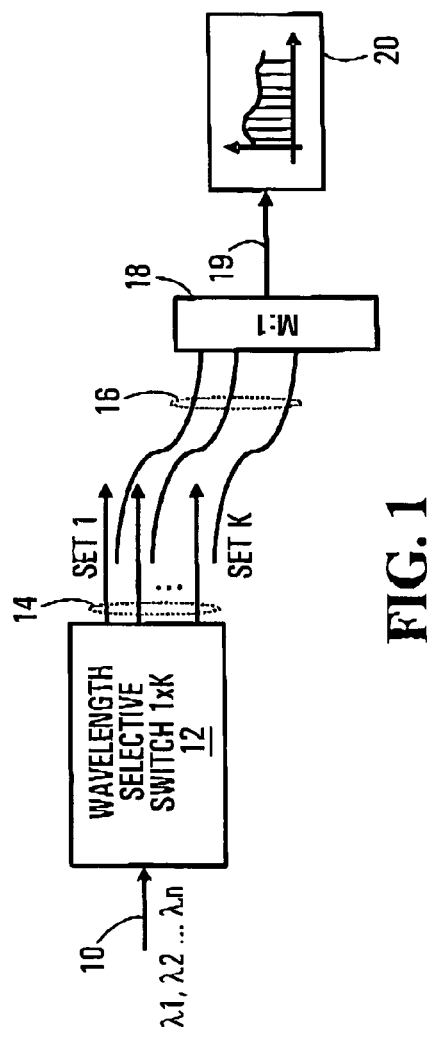
FIG. 1 is a schematic diagram of an embodiment of the invention featuring shared optical performance monitoring.

An embodiment of the invention will now be described with reference to FIG. 1 which shows an apparatus enabling shared optical performance monitoring. Shown is a wavelength selective switch 12 having an input 10 and a plurality of outputs 14. The wavelength selective switch 12 performs a wavelength selective switching of any input wavelength to any of the output ports 14. Each wavelength is routed to only a single output port. Each output port is shown outputting a respective set of wavelengths, labelled set 1 through K for the K output ports 14. Also shown is a combiner 18 which is connected to receive a respective monitoring component representative of the signal on each output port 14. These monitoring components are collectively indicated at 16. In one embodiment, a tap coupler is provided on each output port which routes some small percentage of the light from the output port as the monitoring component to the combiner 18. A specific method of obtaining these monitoring components is also described below with reference to FIG. 6.

The combiner 18 combines all the signals 16 into a single monitoring signal 19. The monitoring signal 19 is then input to optical performance monitoring equipment (OPM) 20. Optical performance monitoring equipment 20 performs any type of optical performance monitoring upon signal 19. Various specific examples are given below. Preferably, the optical performance monitoring equipment 20 produces a power measurement for each wavelength channel various optical performance monitoring equipment are known in the art and any such equipment can be employed. For example, some implementations feature a diffraction element which disperses the light of the incoming port on to an array of photodiodes which produce a set of power readings for a set of wavelengths. In another example, a dispersive element is provided which sweeps through a range of wavelengths such that a particular wavelength is received by a photodiode and a reading for that wavelength can be taken, and as the sweeping is performed, readings for multiple wavelengths can be obtained. As will be seen below, advantageously, the results produced by the single optical performance monitoring equipment 20 can be used to infer performance characteristics for each of the output ports 14.

The example of FIG. 1 shows a single input port 10 and K output ports 14. More generally, there may be one or more input ports through which multi-wavelength signals are received, and a plurality of output ports. In the illustrated example, the function performed between the input ports and the output ports is a wavelength selective switching function. However, more generally any wavelength sensitive device that implements a function or combination of functions that takes wavelengths from the input port or ports, and sends each wavelength to an output port can be employed. For example, a reconfigurable add/drop multiplexing function might be employed between the input ports and the output ports. Preferably, substantially all of the light of a given wavelength is routed from an input port to a selected output port. However, it is to be understood there might be some leakage which results in less than 100% of a given wavelength appearing at the selected output port.

Combiner 18 is any device capable of performing the required combination of signals 16 or more generally whatever number of signals that are to be monitored to produce the monitoring signal 19. Examples of suitable devices include fused fiber coupler or passive waveguide combiners realized in Silica on Silicon technology.

In the illustrated example, the combiner 18 is an M:1 device. Preferably M≧K. However, it may be that a subset of the output ports are to be monitored in which case M might be less than K.

For the embodiment of FIG. 1, and the embodiments of FIGS. 2 to 5 described below, it is to be understood that for the readings produced by the optical performance monitoring equipment 20 to be associated with the correct output port, each wavelength in the input 10 must be uniquely routed to a single output port 14. In this way, when a reading is produced by the OPM for a given wavelength, it can be uniquely mapped to an appropriate output port. If, on the other hand, a wavelength were split between multiple output ports, then the reading produced by the OPM 20 will be for the sum of the powers for that wavelength across the different ports, and it will not be possible to determine the power of each wavelength at each port. Some applications may benefit from such a scenario.

Thus, in effect open loop control is performed to route the wavelengths to the appropriate output. In some embodiments, this open loop control need only be accurate enough to route each wavelength within a "capture range" of the appropriate output port. Then, on the basis of readings taken by the OPM 20, in some embodiments closed loop control can be performed to fine tune the routing.

Figure 2:
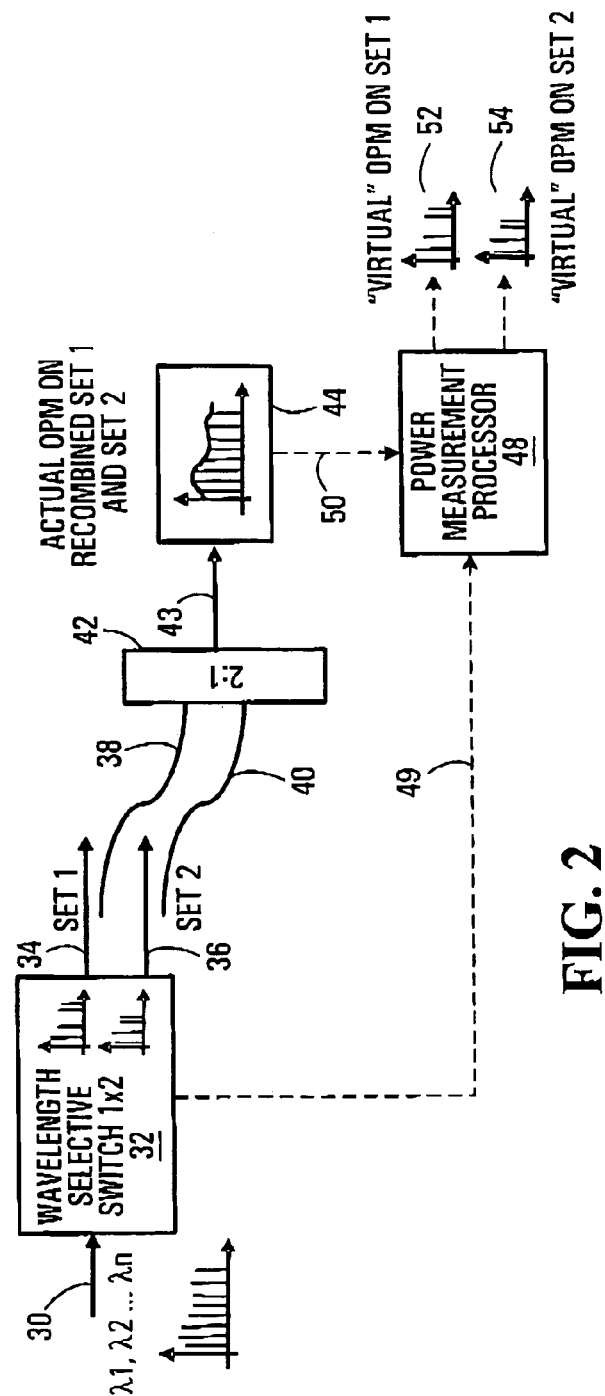
FIG. 2 is a schematic diagram of an embodiment of the invention enabling virtual optical performance monitoring per port.

Referring now to FIG. 2, shown is an example application of the shared optical performance monitoring arrangement of FIG. 1. In this embodiment, input port 30 is connected to wavelength selective switch 32 which has two output ports 34, 36. A first set of wavelengths is output by output port 34 and the second set is output by port 36. Monitoring components 38, 40 of these two signals are fed to 2:1 combiner 42. This produces a monitoring signal 43 which is passed to the wavelength sensitive OPM 44 which produces optical power readings for the monitoring signal output by the combiner 42. These optical power readings are output at 50 to a power measurement processor 48. Power measurement processor 48 also receives wavelength information 49 from the wavelength selective switch which provides a wavelength map of which wavelengths were routed to which output port. Thus, the inputs to the power measurement processor 48 consist of measurements of the power for each wavelength, and information identifying a port for each wavelength. On the basis of this information, the power measurement processor 48 rearranges the power readings according to the sets of wavelengths routed to each port to produce a "virtual" optical performance monitoring output for each output port 34 and 36. These two "virtual" outputs are indicated at 52, 54. Output 52 contains power readings for each of the wavelengths in set one output at port 34, and output 54 contains power readings for each wavelength in the set two output by port 36. The two outputs 52, 54 are effectively what one would achieve with a system in which there were two separate optical performance monitoring equipments included.

The power measurement processor 48 is any equipment capable of processing the power readings together with the wavelength information 49 to produce the virtual OPM outputs 52, 54. This might be implemented in hardware, software or any suitable combinations thereof. The link between the WSS 32 and the power measurement processor 48 is to be considered a logical link in a sense that this information needs to be made available to the power measurement processor 48 but any suitable mechanism of providing this information may be employed. This could involve actual signalling between two different elements, or simply a data fill in predetermined locations in memory for example. Similarly, the power readings output by the OPM 44 can be in any suitable format. These might be analog signals or simply digital values understood by the power measurement processor 48.

In the illustrated example, the processing performed in power measurement processor 48 is simply to take the power readings received from the OPM 44, and put together a collection of the readings that apply to a given port. The output of the power measurement processor 48 can be any suitable form desired by a given application. For example, a graph connecting the readings for the appropriate wavelengths of each port can be produced, or tabular data for the appropriate wavelengths can be produced.

It is readily apparent how the embodiment of FIG. 2 can be extended to an arbitrary number of output ports in a wavelength selective switch 32 and/or to handle an arbitrary device in place of WSS 32 which routes wavelengths uniquely between any number of input ports and any number of output ports according to an internal routing table represented in wavelength information 49.

Figure 3:
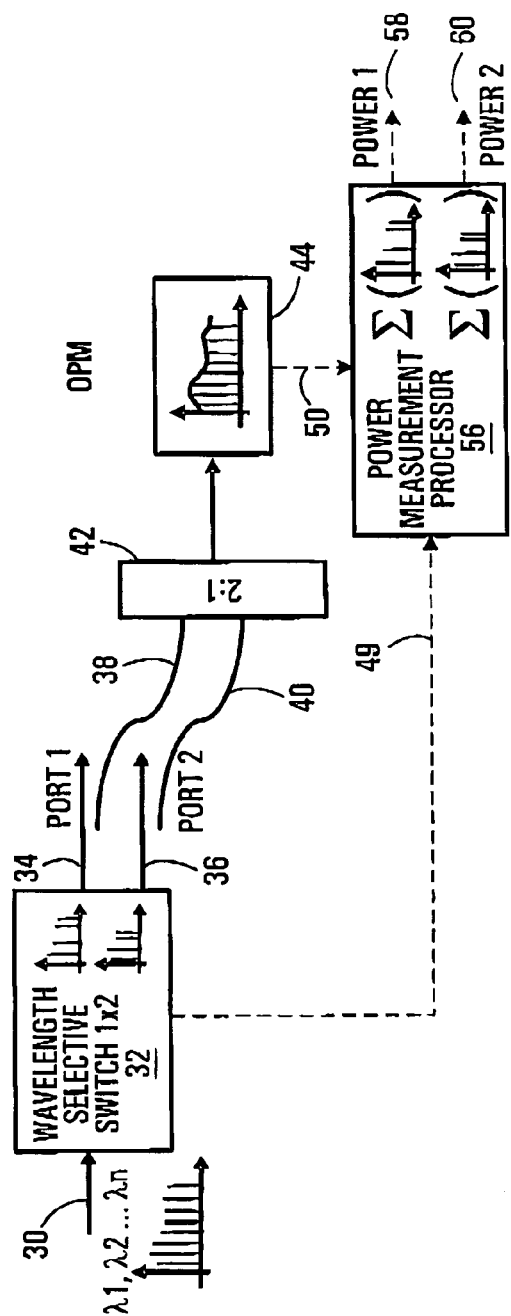
FIG. 3 is a schematic diagram of an embodiment of the invention enabling virtual power monitoring per port.

Referring now to FIG. 3, shown is another embodiment of the invention that is very similar to that described with reference to FIG. 2. In this case, the power measurement processor 48 of FIG. 2 is replaced with power measurement processor 56 which performs a per port summing of the power readings produced by the OPM 44. This involves taking the information 49 identifying which wavelengths are going to which port, and summing up the optical power readings for the wavelengths going to each port to produce an overall power reading per port. The power measurement processor 56 then produces two outputs 58, 60 which represent the power present on the two ports 34, 36. This is effectively a "virtual" pin diode function being implemented on each port.

For the embodiment of FIG. 3, like the embodiment of FIG. 2, modifications can easily be made to extend the number of input ports and/or the number of output ports and the virtual photodiode effect can equally be applied to functions other than wavelength selective switching. More generally, the power measurement processor 56 can be configured to perform per port "virtual OPM" on some ports, and per port total power measurement on some ports. The two sets of ports can be the same, different, or overlapping.

Another embodiment of the invention will now be described with reference to FIG. 4 which involves the use of a shared optical performance monitoring equipment to control a WSS to realize dynamic gain equalization (DGE) on a per port basis. In the illustrated example, an input signal on port 70 is processed by wavelength selective switch 72 to route wavelengths to a set of output ports 74. Monitoring components 76 are extracted which are representative of the output signals of the WSS 72, and these are input to a combiner 77 and then monitoring device 78. Monitoring device 78 again produces a power per wavelength. In this case, it is assumed that the wavelength selective switch 72 is performing an attenuation of each wavelength by a respective amount. A "virtual" DGE profile is produced for each output port 74 of the WSS 72. The virtual DGEs for sets 1, 2 and K are indicated at 90, 92 and 94 in FIG. 4. A control device 82 receives the power measurements from the monitoring device 78 and wavelength routing table 86 from WSS 72 and attempts to impose a desired attenuation profile with respect to wavelength per port. Control signals 84 are generated as a function of the virtual DGE profiles and the virtual OPM measurements. These are fed back to the WSS 72 to appropriately control the wavelength selective switch to achieve the desired attenuation. The "virtual DGE profiles" are simply collections of the wavelength power output for the wavelengths output by a given port. In a preferred embodiment, control device 82 stores a "desired DGE profile" per port. Then, the WSS 72 is configured to apply the appropriate attenuation to the wavelengths that do appear at that port.

Figure 4:
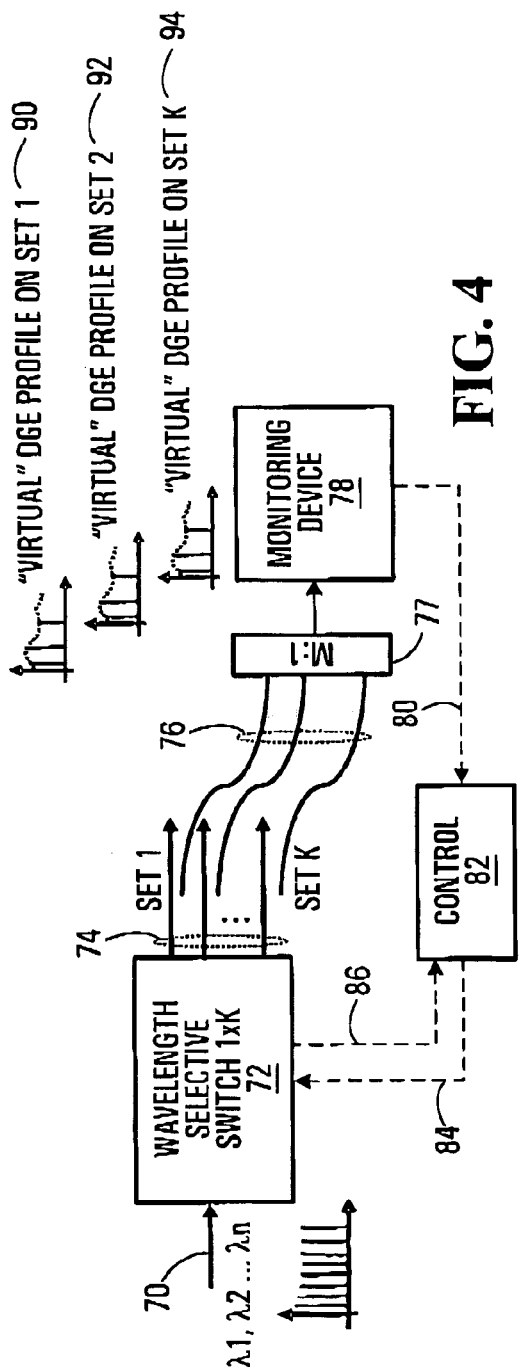
FIG. 4 is a block diagram of an embodiment of the invention allowing virtual per port DGE (dynamic gain equalization)

As in previous embodiments, the embodiment of FIG. 4 is modifiable to handle an arbitrary number of ports. Also, the wavelength selective switch 72 may be replaced with another device that has an attenuation function for at least some of the wavelengths.

Figure 5:
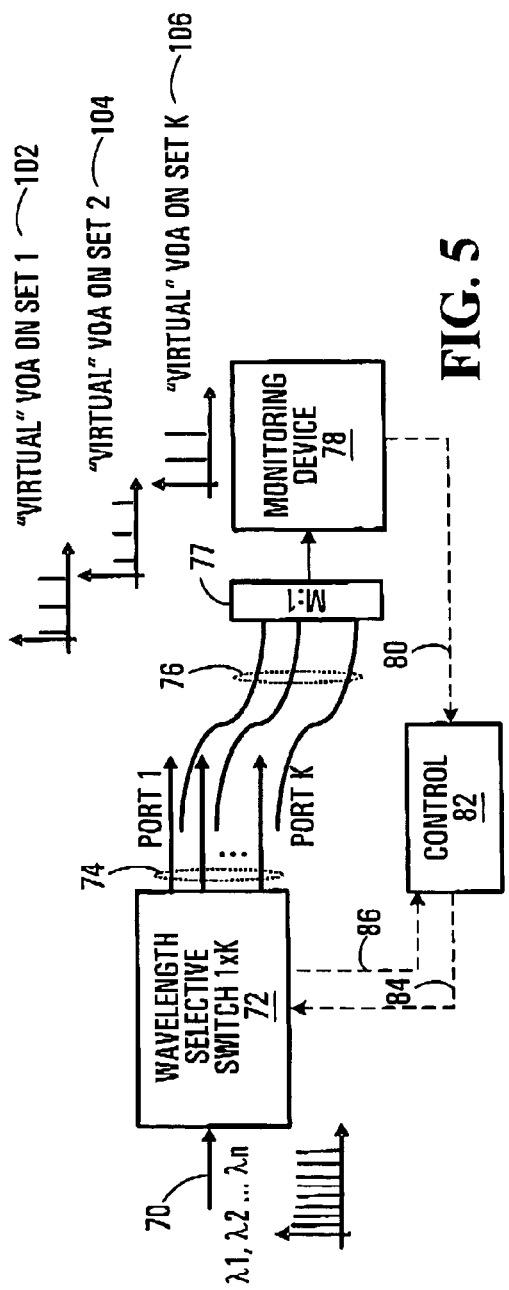
FIG. 5 is a block diagram of an embodiment of the invention allowing virtual per port VOA (variable optical attenuation)

FIG. 5 is another embodiment which is very similar to the FIG. 4 embodiment but instead of imposing a virtual DGE profile for each port, it sets a fixed level of attenuation on all wavelengths routed to a given port 74, effectively realizing a "virtual" VOA (variable optical attenuator) function. More generally, control device 82 can be configured to control the WSS (more generally wavelength sensitive device) and monitoring device 78 either as a DGE and OPM for some ports (as in FIG. 4) and/or as a VOA and pin detector for other ports (as in FIG. 5).

Figure 6:
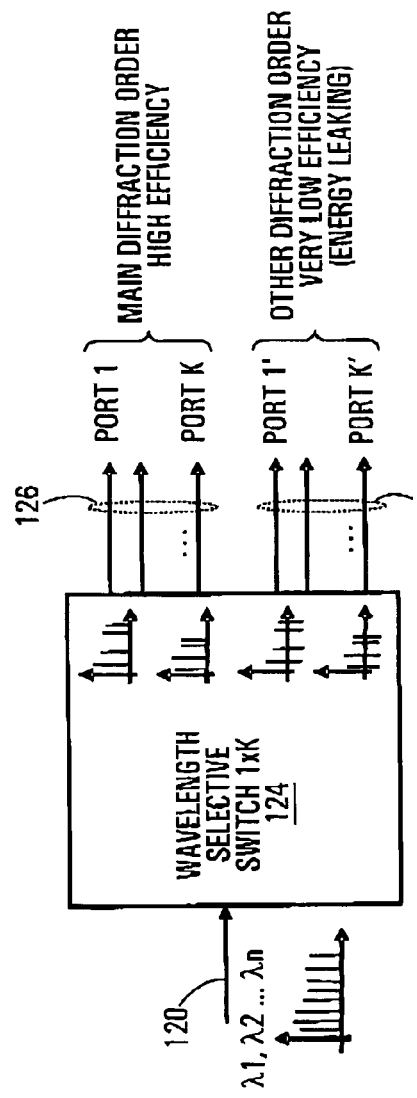
FIG. 6 is a schematic diagram of an example circuit for obtaining optical signals for use in performance monitoring.

As indicated previously, any appropriate mechanism for extracting a small portion of the signal output in each output port can be employed to produce the monitoring components that are then fed to the combiner and the single optical performance monitor. Taps realized with fused fiber coupler (e.g. 99:1 taps) are one example of such devices. FIG. 6 shows an example mechanism that does not involve actually removing any of the light from the main diffraction order of the output signals. Shown is a WSS 124 connected to receive a multi-wavelength input signal 120 and to route wavelengths individually to output ports 126. In this example, the main diffraction order is routed to the ports 126. The measurement signals are taken through ports 1' through K' 128 which are connected to receive a diffraction order other than the main diffraction order, typically with low efficiency. The arrangement is such that the coupling from the input port 120 to the ghost output ports 128 is related by predetermined and fixed relationship to the coupling from the input port to the corresponding output ports 126 for each given wavelength.

As indicated above, the wavelength routing functionality between the input port or ports and the output ports can be anything that routes one of each incoming wavelength to a selected port. Another specific example will now be described with reference to FIG. 7.

Figure 7:
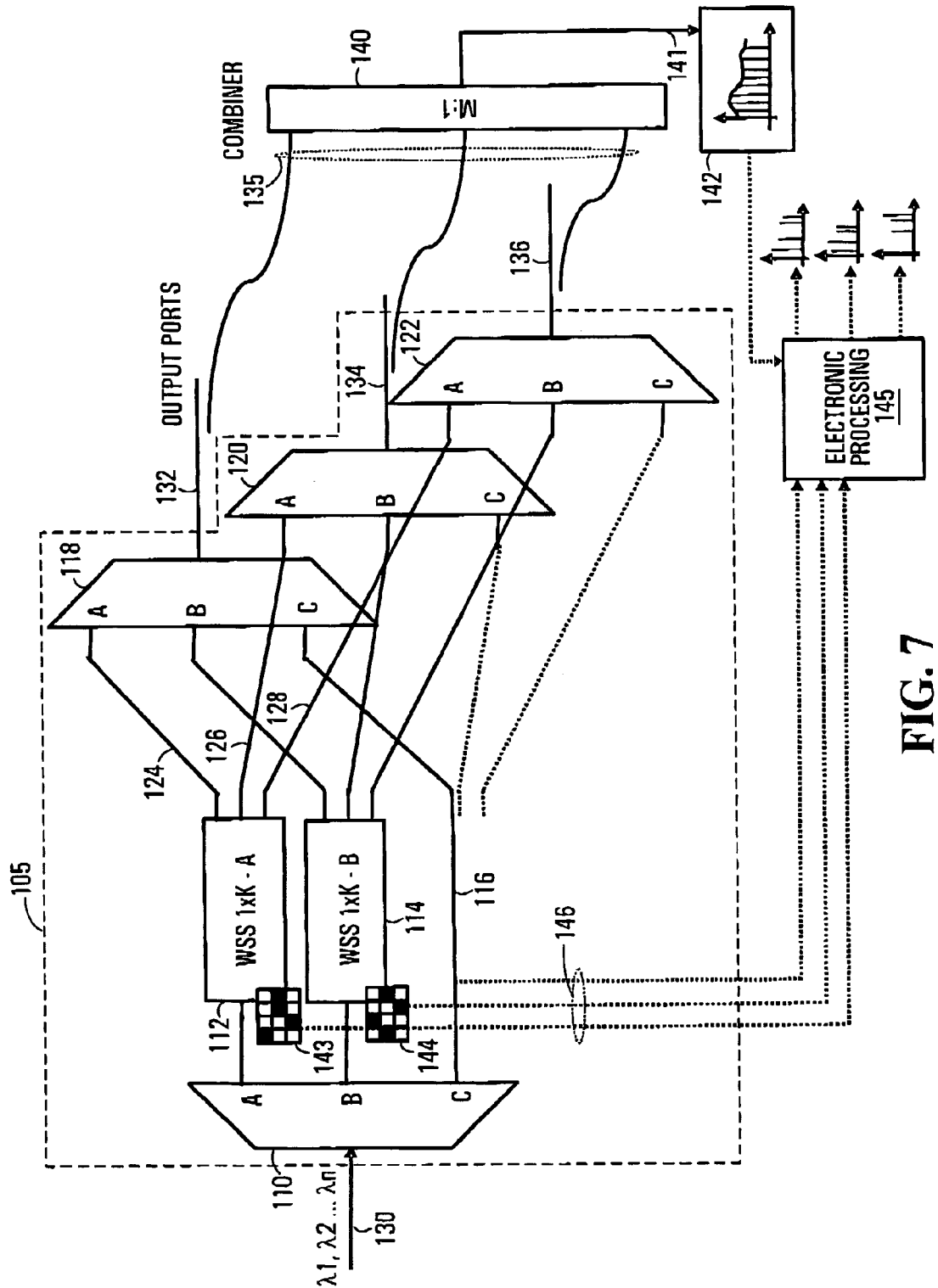
FIG. 7 is a block diagram of another embodiment of the invention in which the functionality between the input port and the output ports is a modular WSS.

FIG. 7 shows a modular wavelength selective switch 105. The switch features an input port 130 and a plurality of output ports 132,134,136. The illustrated example shows three output ports, but any number of ports can be employed. The input port 130 is connected to a first wavelength selective device 110 that is responsible for routing subsets of wavelengths received through the input port to a set of output ports of the wavelength selective device 110. In the illustrated example, it is assumed that there are three such output ports that output subsets labelled A, B and C. In some embodiments, the wavelengths of a given subset are contiguous. The wavelengths of Group A then pass through a 1×K wavelength selective switch 112. WSS 112 routes each wavelength it receives to a selectable output port of K output ports. Preferably, WSS 112 has an output port for each output of the modular WSS. More particularly, it has an output 124 associated with output 132; an output 126 which associated with output 134; and output 128 which is associated with output 136. Output 124 of WSS 112 is connected to an input of another wavelength selective device 118. Preferably device 118 has a number of inputs equal to the number of outputs of device 110. Device 118 performs a combining function upon the inputs to produce the overall output at 132. In the absence of connections to WSS 114 and direct connection 116, described below, device 118 only has a single input. Similarly, the second output 126 is connected to a port of wavelength selective device 120 which produces overall output 134 and output 128 is connected to wavelength selective device 122 which produces overall output 136.

In operation, in the absence of wavelength selective switch 114 and direct connection 116 described below, the wavelengths of subset A are routed by wavelength selective device 110 from the input port 130 to wavelength selective switch 112. Wavelength selective switch 112 performs a wavelength switching function to switch any one of the input wavelengths to one of the output ports 124,126,128. In the illustrated example, any wavelength can be routed selectively to any of the three output ports 124,126,128. Then the wavelength selective device 118 performs a combining function on signals received on its three input ports to produce the output signal at 132. However, in the absence of WSS 114 and connection 116, there would only be the signal from WSS 112. The wavelengths selectively routed to output 126,128 also appear at outputs 134,136 in a similar manner. In summary, it can be seen that the effect of the arrangement is to enable the routing of any of the wavelengths of subset A from the input port 130 to any selected output port 132,134,136.

The arrangement of FIG. 7 is now scalable to allow additional wavelength routing. In particular, a second WSS 114 can be installed as shown in FIG. 7. It is connected to receive the wavelengths of subset B from the input wavelength selective device 110, and to perform a wavelength selective function upon these wavelengths to route any wavelength of Group B to any output port of device 114. The output ports of WSS 114 are then connected to respective input ports of the wavelength selective devices 118,120,122. Now, with the inclusion of wavelength selective switch 114, any wavelength in subset B that appears at the input 130 is selectively routable to any output port 132,134,136. In other words, the operable bandwidth of the overall device has increased with the addition of the second WSS 114. Also shown is a direct connection for the wavelengths of subset C from device 110 to device 118 meaning these wavelengths always go to port 132. Alternatively, another WSS can be added to perform wavelength selective switching between any wavelength of subset C in the input to any selected output port 132,134,136.

As in previous embodiments, a monitoring component of the signals output at each port 132,134,136 is produced. These monitoring components collectively indicated at 135 are input to combiner 140 which has a single output 141 connected to OPM 142. The wavelength information for WSS 112 and 114 is indicated abstractly as 143,144, and this information is made available to power measurement processor 145 along with the information about direct connection 116 and along with the readings produced by OPM 142. Then as in previous embodiments a virtual per port power or wavelength characteristic can be obtained by mapping the appropriate wavelength power readings to the appropriate ports. Feedback may be performed in some implementations to achieve a VOA or DGE function. Details of further modular WSSs to which shared monitoring can be applied are described in Applicant's U.S. Provisional Application No. 60/587,906 filed Jul. 15, 2004 entitled "Modular wavelength Selective Switch" and co-pending regular U.S. application Ser. No. 11/181,701 filed the same day as this application both hereby incorporated by reference in their entirety.

In another embodiment, the combiner that combines the tap signals taken from the output ports can have different tap ratios per port. Assuming these ratios are known by the power measurement processor, the performance of each output port can be determined taking into account the ratios. Furthermore, in some embodiments each input port can route any wavelength to any output port. However, there may be one or more additional ports containing wavelengths which are not routed. These wavelengths will need to be non-overlapping with the output wavelengths of the other ports. This extra port signal can then also be input to the combiner. An example of this is shown in FIG. 8 where a single input port 150 is input to a wavelength selective switch 152 to produce a set of output signals on output ports 154 as in the above examples. The tapped signals 156 are input to a combiner 160. The combiner has an extra port for receiving another signal 158 containing wavelengths which were not subject to routing by the wavelength selective switch 152. Furthermore, in the illustrated example, each of the signals 156 is subject to combiner ratios $\alpha^1, \ldots \alpha^k$. These combiner ratios can be arbitrary so long as they are known and calibrated in advance. Then, the optical power monitoring 162 is performed as before. The input to the OPM 162 is $\alpha_1$.set 1+ ... + $\alpha_K$.set K. There can be extra combiners ports so long as there are no two same wavelengths on any of the ports input to the combiner. For example, the extra ports can contain wavelengths in the L-bands while the WSS works in the C-band.

Another example of the functionality between the input ports and the output ports will now be described with reference to FIG. 9. Shown is an input port 170 connected to a WSS 172 for routing any of the input wavelengths to output ports 174 and 175. The signal on output port 175 is subject to further processing. In the illustrated example this consists of an optical amplifier 178 which amplifies that signal. Portions of the signals output through ports 174 are tapped off to produce signals 176. Similarly, a portion of the output of the amplifier 178 is tapped off as signal 180. These are then input to a combiner 181 which produces a monitoring signal 183 which is input to the optical performance monitoring equipment 182. In the illustrated example, the combiner also applies combiners ratios $\alpha^1$ through $\alpha^k$ to the inputs to the combiner 181. Thus, the monitoring signal 183 is effectively $G.\alpha_1$.set 1+ ... + $\alpha_K$.set K, where G is the gain of the optical amplifier.

In the above example, an amplifier, which might for example be an EDFA, is imposed in the path of one of the outputs. More generally, there may be any appropriate linear processing of the output signals between the WSS and OPM. This example also illustrates how there can be just about any functionality between the input port and the combiner ports again so long as a unique routing of each wavelength to the output ports is performed.

Figure 10:
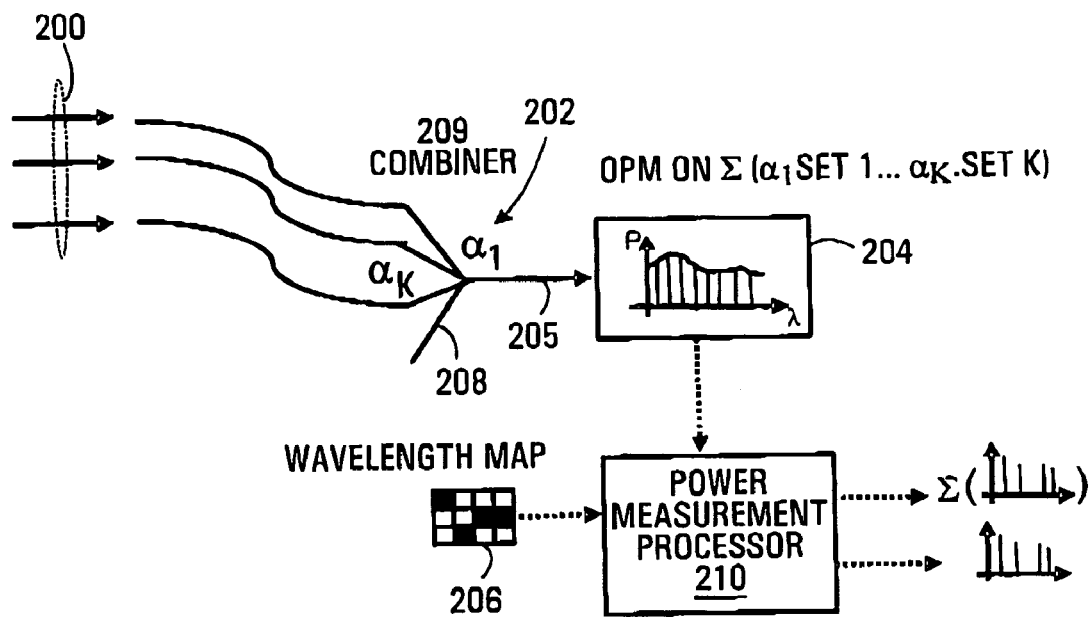
FIG. 10 is a block diagram of a performance monitoring system provided by an embodiment of the invention.

A very generalized embodiment will now be described with reference to FIG. 10. In this embodiment, there are at least two optical monitoring input ports 200 that are connected to receive respective sets of incoming wavelengths, and the wavelengths sets are non-overlapping. The input ports 200 are connected to an optical combiner 209 which combines the light received at the input ports into a monitoring signal 205. In so doing, the combiner may apply combiner ratios 202. Also shown is an optional extra port 208 that can be included so long as unique wavelengths are presented on inputs 200 and 208. A wavelength sensitive optical power monitoring device 204 is connected to receive the monitoring signal 205 and determine the power per wavelength of the monitoring signal 205. This information is passed to power measurement processor 210. The power measurement processor 210 also has a wavelength map 206 which identifies which wavelengths are in which port. Then, in some embodiments the power measurement processor computes the total power incoming from each port according to the wavelength map of incoming wavelengths to this particular port. In other embodiments, the power measurement processor 210 computes the power per wavelength corresponding to a particular port according to the wavelength map of incoming wavelengths to that particular port.

In some embodiments, at least one of input ports to the combiner 209 can be selectively turned off and monitoring is only performed for the signals received at the combiner 209 at ports which are on.

Figure 11:
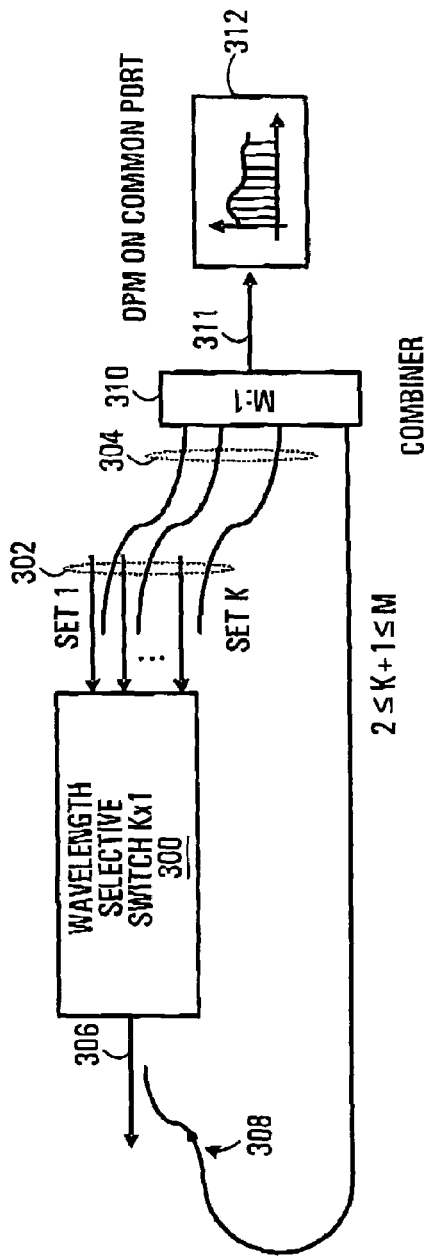
FIG. 11 is a block diagram of a performance monitoring apparatus provided by another embodiment of the invention.

An example of an embodiment with such ports will now be described with reference to FIGS. 11 and 12 which provides a bi-directional OPM configuration. Referring first to FIG. 11, shown is a WSS 300 having a plurality of ports 302, and having a common port 306. The WSS 300 routes wavelengths from the ports 302 to the common port 306. Also shown is a combiner 310 connected to receive monitoring components 304 in respect of ports 302, and to receive monitoring component 308 in respect of common port 306 to produce monitoring signal 311. For the configuration of FIG. 11, ports 302 are the input ports and port 306 is the output port, and the OPM 312 monitors the output port 306, and not the K input ports 302.

Figure 12:
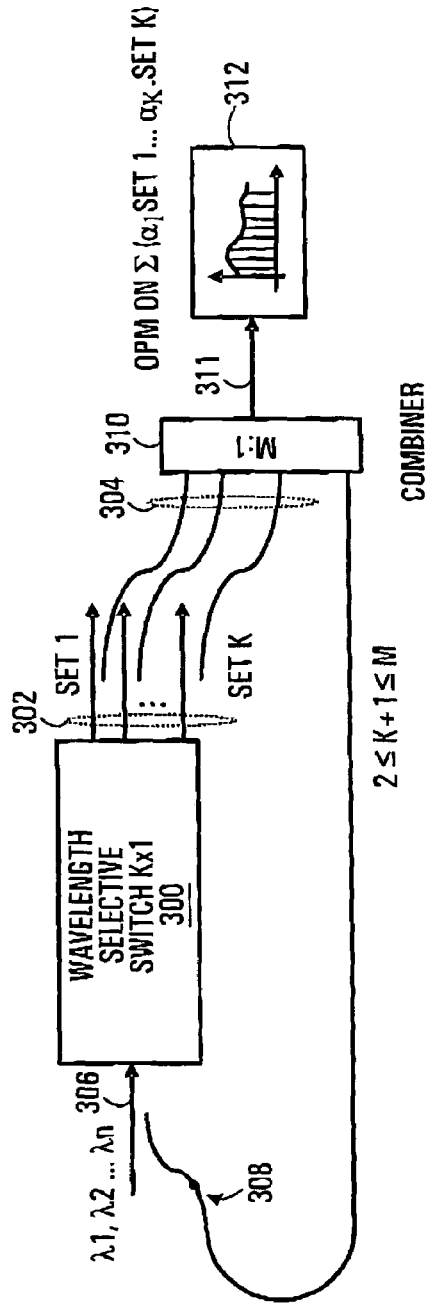
FIG. 12 is a block diagram of a performance monitoring apparatus as per the embodiment of FIG. 11 shown working in opposite direction.

FIG. 12 shows the same arrangement of FIG. 11, but operating in the reverse direction, with the common port 306 functioning as the input port, and ports 302 functioning as the output ports. The WSS 300 in this case routes non-overlapping subsets of wavelengths from the input port 306 to the output ports 302 as in other embodiments. The OPM 312 in this case monitors the monitoring signals 304 for the K output ports 302 and not the monitoring signal 308 for the input port 306. The couplers that couple light from ports 302 and 306 are directional such that for the FIG. 11 configuration, light from the port 306 passes to the combiner 310, but no light from ports 302 goes to the combiner. The same arrangement operated in reverse (FIG. 12) couples light from the ports 302 to the combiner 310, but no light from port 306 goes to the combiner.

The arrangements of FIG. 11 and FIG. 12 may be independently provided. In another embodiment, a common arrangement that can be configured to function as either FIG. 11 or FIG. 12 is provided.

In a preferred embodiment, taps for shared OPM take only a small percentage of the energy of the optical signals, for example <1%. In the above described embodiments, the tapping is parallel in the sense that a respective distinct tap is taken for each port and the tapped signals are then combined in a separate combining device.

Figure 13:
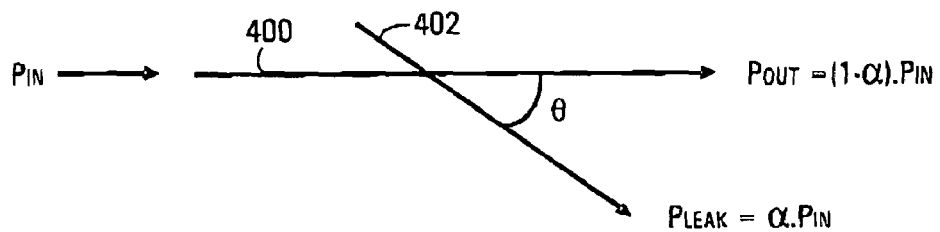
FIG. 13 is a schematic illustration of coupling between two crossed waveguides.

In another embodiment, the tapping and combining functions are integrated, and the tapping is conducted in a serial fashion. This embodiment is based on a waveguide property: a waveguide crossing is leaky. Referring to FIG. 13, a first waveguide 400 is shown and a crossing waveguide 402 is shown. The input power to waveguide 400 is assumed to be Pin. The amount of power that leaks into the crossing waveguide 402 is represented by a coupling factor $\alpha$ which is a function of the angle $\theta$ between the two waveguides 400, 402. The power that makes it to the output of the waveguide 400 is given by Pout=$(1-\alpha)$Pin, and the power that goes to the crossing waveguide is $\alpha$Pin.

Figure 14:
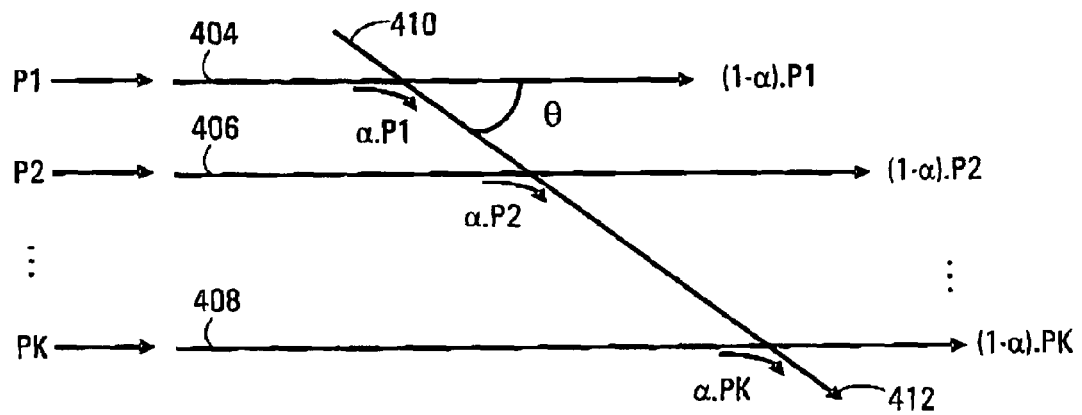
FIG. 14 is a schematic illustration of a tap and continue arrangement provided by an embodiment of the invention.

Shown in FIG. 14 is an illustrative example of how a crossing waveguide can be used to perform tap coupling and combining for a plurality of waveguides. Shown are a set of K waveguides 404, 406, ..., 408 having input powers P1, P2, ..., PK respectively. A crossing waveguide 410 is also shown which in the illustrated example crosses all of the other waveguides 404, 406, ..., 408 at a common crossing angle $\theta$ in what will be referred to as a "tap and continue" arrangement.

The signal 412 appearing at the output of the crossing waveguide 410 is given in FIG. 14. With α<~1% and K<~20, the impact of the known non-uniformity of coupling vs. port is not significant and can be calibrated out. The output of the crossing waveguide 410 can then be input directly to the OPM of any preceding embodiment without the need for a separate combiner.

Figure 15:
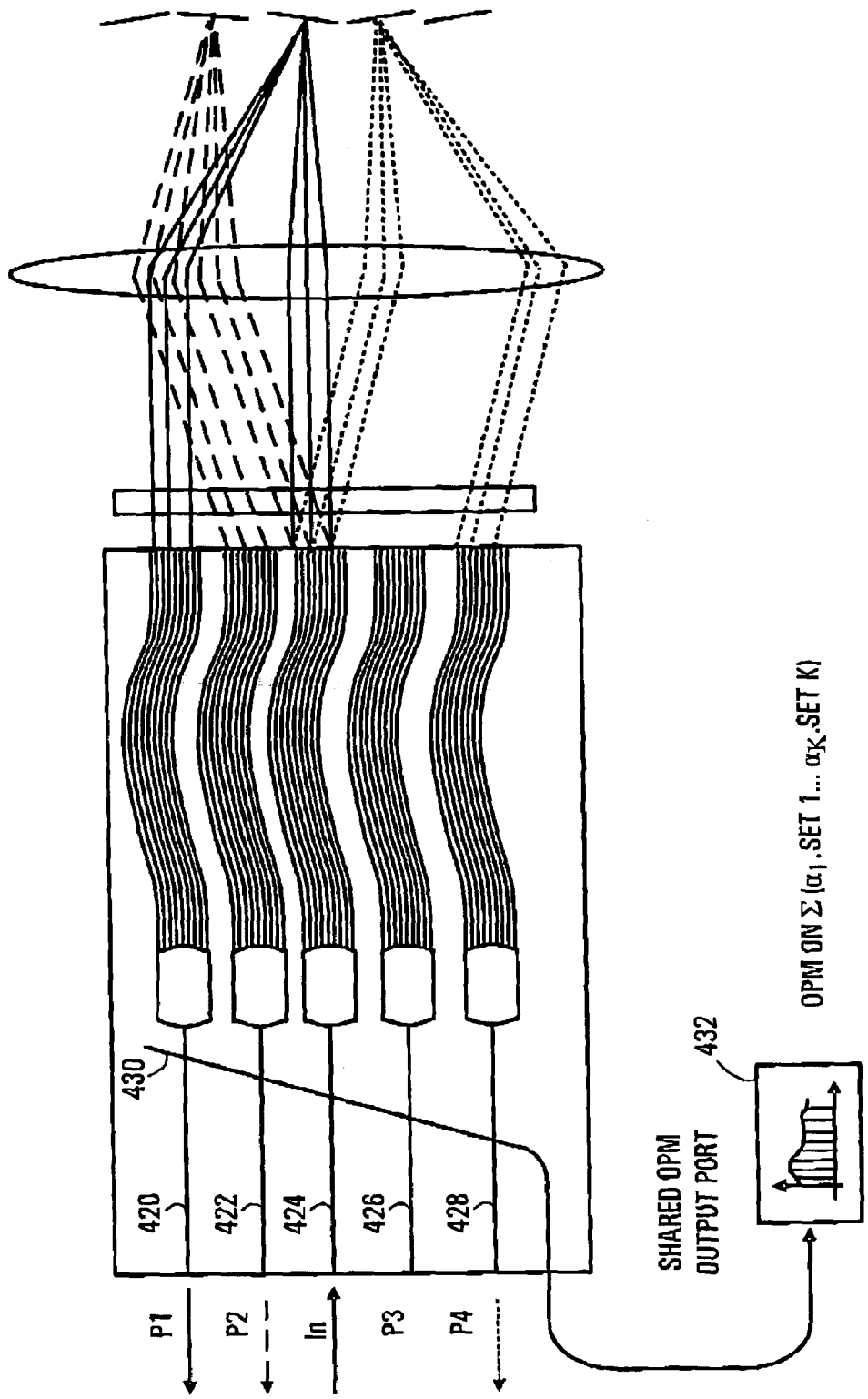
FIG. 15 is a schematic illustration of a system featuring the tap and couple arrangement of FIG. 14 to produce a signal for combined optical performance monitoring for a particular WSS arrangement.

A particular example is shown in FIG. 15 which shows a reconfigurable add drop multiplexer with waveguides 420, 422,424,426,428 carrying signals between a single input port and four output ports and the remainder of the arrangement as described in commonly assigned U.S. patent application Ser. No. 10/493,107 hereby incorporated by reference in its entirety. A crossing waveguide 430 is shown which crosses each of the waveguides 420,422,424,426,428 to produce a monitoring signal for input to OPM 432 the output of which may be available for post processing by a power measurement processor (not shown) as in previous embodiments. The example of FIG. 15 is specific to the particular reconfigurable add drop multiplexer shown. More generally, in any wavelength selective device that has a waveguide connected to each port that is to be monitored, a tap and continue arrangement can be employed assuming the waveguides are suitably arranged.

Figure 16:
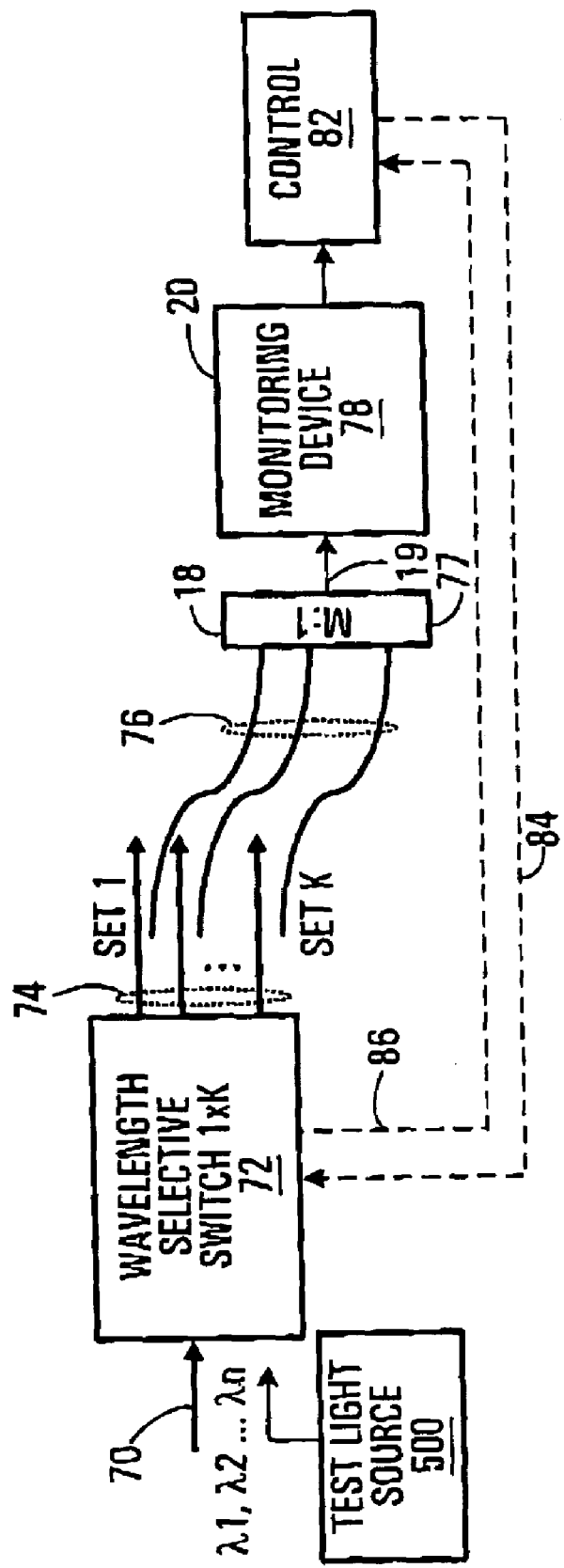
FIG. 16 is a schematic illustration of an embodiment similar to that of FIG. 4 also featuring a self-test capability.

Referring now to FIG. 16, another embodiment of the invention includes a self-test capability. The arrangement of FIG. 15 is the same as that of FIG. 4 except there is an additional test light source 500 that can couple a test signal into the input of the WSS 72. A coupler or a 2×1 optical switch at the input can be used to receive both the normal input from port 70, and the test signal, but it is expected only one of the two would be active at a time. The test light source 500 might for example be a broadband light source or a tunable light source to name a few examples.

When operating in test mode, the test light source 500 generates the test signal having known characteristics. The wavelength(s) of the test signal are mapped to the WSS output ports 74 in accordance with wavelength information 86. As in previous embodiments, the control device 82 can then perform processing to identify per port virtual DGE, OPM, or whatever other function is required. On the basis of this information and cycling through various predetermined wavelength configurations 86, calibration of the 1×K WSS can be performed as indicated by feedback signal 84.

More generally, a self-test option may be included with any of the embodiments described herein.

In the embodiments described, monitoring components are assumed to be some small fraction of signals to be monitored. More generally, any optical signals may be combined followed by shared optical performance monitoring on the combined signal, with knowledge of the wavelengths that were in each optical signal.

Numerous modifications and variations of the present invention are possible in light of the above teachings. It is therefore to be understood that within the scope of the appended claims, the invention may be practiced otherwise than as specifically described herein.

We claim:

1. An optical monitoring apparatus comprising:
   at least two optical monitoring input ports each to receive a respective set of incoming wavelengths;
   an optical combiner to combine light received at the monitoring input ports into a combined monitoring signal;
   a wavelength sensitive power monitoring device to determine a power measurement per wavelength of the combined monitoring signal; and
   a power measurement processor adapted to process the power measurements to produce per-monitoring input port information;
   wherein the power measurement processor is adapted to determine a total power incoming from a particular monitoring input port according to a wavelength map of incoming wavelengths to this particular port with an assumption that the sets of incoming wavelengths are non-overlapping.

2. The optical monitoring apparatus of claim 1, further adapted to generate at least one feedback signal as a function of the total power determined for a given monitoring input.

3. The optical monitoring apparatus of claim 1, wherein for at least one monitoring input port the power measurement processor is adapted to determine a power per wavelength for each wavelength corresponding to the monitoring input port according to a wavelength map of incoming wavelengths to the monitoring port with an assumption that the sets of incoming wavelengths are non-overlapping.

4. The optical monitoring apparatus of claim 1 wherein the optical monitoring apparatus further adapted to generate at least one feedback signal as a function of at least one of the total powers; and for at least one monitoring input port the power measurement processor is adapted to determine a power per wavelength for each wavelength corresponding to the monitoring input port according to a wavelength map of incoming wavelengths to the monitoring port with an assumption that the sets of incoming wavelengths are non-overlapping, the optical monitoring apparatus further adapted to generate at least one feedback signal as a function of at least one of the per wavelength powers determined.

5. The optical monitoring apparatus of claim 1 wherein at least one of the optical monitoring input ports can be turned on and off.

6. An optical monitoring apparatus comprising:
   at least two optical monitoring input ports each to receive a respective set of incoming wavelengths;
   an optical combiner to combine light received at the monitoring input ports into a combined monitoring signal;
   a wavelength sensitive power monitoring device to determine a power measurement per wavelength of the combined monitoring signal; and
   a power measurement processor adapted to process the power measurements to produce per-monitoring input port information;
   wherein the power measurement processor is adapted to determine a power per wavelength for each wavelength corresponding to a particular monitoring input port according to a wavelength map of incoming wavelengths to this particular port with an assumption that the sets of incoming wavelengths are non-overlapping.

7. The optical monitoring apparatus of claim 6 further adapted to generate at least one feedback signal as a function of the per wavelength power determined for a given monitoring input.

8. An optical monitoring apparatus comprising:
   at least two optical monitoring input ports each to receive a respective set of incoming wavelengths;
   an optical combiner to combine light received at the monitoring input ports into a combined monitoring signal;
   a wavelength sensitive power monitoring device to determine a power measurement per wavelength of the combined monitoring signal; and
   a power measurement processor adapted to process the power measurements to produce per-monitoring input port information;

wherein the optical combiner applies a set of combiner's ratios to signals received at the monitoring input ports, and the power measurement processor takes into account the combiner's ratios in producing the per-monitoring input port information.

9. An apparatus comprising:
at least one input port, wherein a respective optical signal containing at least one wavelength is receivable at each input port;
a first wavelength sensitive device to separate the wavelengths received at the at least one input port into at least two output signals containing non-overlapping subsets of wavelengths;
an optical combiner to combine at least two of the output signals or monitoring components of at least two of the output signals to produce a monitoring signal;
a wavelength sensitive power monitoring device optically connected to receive the monitoring signal;
a self-test input for inputting a test signal to the wavelength sensitive device; and
a power measurement processor adapted to process the power measurements to produce per output signal information, and to generate feedback control signals as a function of the power measurements compared to known self-test input.

10. The apparatus of claim 9 wherein the wavelength sensitive device comprises a reconfigurable add/drop multiplexer.

11. The apparatus of claim 9 wherein the wavelength sensitive device comprises a modular wavelength selective switch.

12. The apparatus of claim 11 wherein the modular wavelength selective switch comprises at least two wavelength selective switches having non-overlapping wavelength maps.

13. The apparatus of claim 9 wherein the optical combiner has input ports for receiving signals from a wavelength selective switch comprising said wavelength sensitive device, and has at least one additional input port.

14. The apparatus claim 9 wherein the optical combiner comprises a tap and continue arrangement.

15. The apparatus claim 9 wherein the optical combiner is a distinct element connected to a plurality of optical taps.

16. The apparatus of claim 9 wherein the wavelength sensitive device comprises: a wavelength selective switch and for at least one output port of the wavelength selective switch a respective further substantially linear optical processing element.

17. The apparatus of claim 16 wherein each substantially linear optical processing element is a gain element.

18. An apparatus comprising:
at least one input port, wherein a respective optical signal containing at least one wavelength is receivable at each input port;
a first wavelength sensitive device to separate the wavelengths received at the at least one input port into at least two output signals containing non-overlapping subsets of wavelengths;
an optical combiner to combine at least two of the output signals or monitoring components of at least two of the output signals to produce a monitoring signal; and
a wavelength sensitive power monitoring device optically connected to receive the monitoring signal;
a self-test input for inputting a test signal to the wavelength sensitive device; and
a power measurement processor adapted to process the power measurements to produce per output signal information, and to perform calibration of the wavelength sensitive device as a function of the power measurements compared to known self-test input.

19. An apparatus comprising:
at least one input port, wherein a respective optical signal containing at least one wavelength is receivable at each input port;
a first wavelength sensitive device to separate the wavelengths received at the at least one input port into at least two output signals containing non-overlapping subsets of wavelengths;
an optical combiner to combine at least two of the output signals or monitoring components of at least two of the output signals to produce a monitoring signal;
a wavelength sensitive power monitoring device optically connected to receive the monitoring signal; and
a power measurement processor adapted to process power measurements to produce per output signal information.

20. The apparatus of claim 19 wherein the power measurement processor is adapted to determine a power per wavelength for each wavelength included in a particular output signal according to a wavelength map of incoming wavelengths to be included in that output signal.

21. The apparatus of claim 19 wherein the power measurement processor is adapted to determine a total power of a particular output signal according to a wavelength map of incoming wavelengths included in the particular output by summing power measurements of wavelengths included that output signal.

22. The apparatus of claim 19 wherein the optical combiner combines monitoring components of at least two of the output signals to produce the monitoring signal, the apparatus further comprising a respective tap coupler for extracting each monitoring component from each output signal.

23. The apparatus of claim 19 wherein the wavelength sensitive device comprises a wavelength selective switch.

24. The apparatus of claim 19 wherein the wavelength sensitive device comprises:
said at least one input port;
a respective optical port for each output signal;
for each optical port, a respective dispersive element optically connected to the optical port;
a bulk optical element having optical power;
a plurality of non-transmissive routing elements;
wherein for each wavelength channel: the dispersive element of the input port and the bulk optical element disperses any light of the wavelength channel towards a respective one of said plurality of routing elements, and the respective one of said plurality of routing elements directs the light of the wavelength channel via the bulk optical element to a selected output port of said at least one output port via the respective dispersive element of the selected output port, the selected output port being determined by the respective routing element; and
wherein the optical combiner comprises a tap and continue arrangement for extracting and combining a monitoring component from each output signal.

25. The apparatus of claim 19 wherein the wavelength sensitive device comprises:
a wavelength selective switch adapted to couple an input signal from said input port to the output signals at a first plurality of output ports 1 to K with diffractive elements working at a main diffraction order and to couple the input signal to monitoring components at a second plurality of output ports 1' to K' at another diffraction order with low efficiency, wherein the first set of output ports and the second set of output ports are arranged such that coupling from the input to the second output port i is related by a predetermined and fixed relationship to the coupling from the input to the corresponding first output port i for each given wavelength; the optical combiner combining the monitoring components output by the wavelength sensitive switch.

26. An apparatus comprising:
at least one input port, wherein a respective optical signal containing at least one wavelength is receivable at each input port;
a first wavelength sensitive device to separate the wavelengths received at the at least one input port into at least two output signals containing non-overlapping subsets of wavelengths;
an optical combiner to combine at least two of the output signals or monitoring components of at least two of the output signals to produce a monitoring signal; and
a wavelength sensitive power monitoring device optically connected to receive the monitoring signal;
wherein the wavelength sensitive device is adapted to attenuate each wavelength by a respective amount, the apparatus further comprising: a control element adapted to feed back a control signal to the wavelength sensitive device to impose a predetermined attenuation profile with respect to wavelength for each output signal.

27. An apparatus comprising:
at least one input port, wherein a respective optical signal containing at least one wavelength is receivable at each input port;
a first wavelength sensitive device to separate the wavelengths received at the at least one input port into at least two output signals containing non-overlapping subsets of wavelengths;
an optical combiner to combine at least two of the output signals or monitoring components of at least two of the output signals to produce a monitoring signal; and
a wavelength sensitive power monitoring device optically connected to receive the monitoring signal;
wherein the wavelength sensitive device is adapted to attenuate each output signal by a respective amount, the apparatus further comprising: a control element adapted to feedback a control signal to control the attenuation applied to each output signal.

28. An apparatus comprising:
at least one input port, wherein a respective optical signal containing at least one wavelength is receivable at each input port;
a first wavelength sensitive device to separate the wavelengths received at the at least one input port into at least two output signals containing non-overlapping subsets of wavelengths;
an optical combiner to combine at least two of the output signals or monitoring components of at least two of the output signals to produce a monitoring signal; and
a wavelength sensitive power monitoring device optically connected to receive the monitoring signal;
wherein said wavelength sensitive device comprises:
diffractive elements working at a main diffraction order to couple an input multi-wavelength signal to a plurality of output ports 1 to K;
a second set of output ports 1' to K' for outputting signals of another diffraction order, wherein signals output by the second set of output ports are combined by said optical combiner to produce the monitoring signal;
wherein the first set of output ports and the second set of output ports are arranged such that coupling from the input to the second output port i is related by a predetermined and fixed relationship to the coupling from the input to the corresponding first output port i for each given wavelength.

29. An apparatus comprising:
at least one input port, wherein a respective optical signal containing at least one wavelength is receivable at each input port;
a first wavelength sensitive device to separate the wavelengths received at the at least one input port into at least two output signals containing non-overlapping subsets of wavelengths;
an optical combiner to combine at least two of the output signals or monitoring components of at least two of the output signals to produce a monitoring signal; and
a wavelength sensitive power monitoring device optically connected to receive the monitoring signal;
wherein the optical combiner applies a set of combiner's ratios in producing the monitoring signal, and the power measurement processor takes into account the combiner's ratios when processing the power measurements to produce per output signal information.

30. A tap and continue arrangement comprising:
a plurality of waveguides carrying signals to be monitored;
a crossing waveguide that crosses the plurality of waveguides so as to couple a small fraction of each signal to be monitored into the crossing waveguide;
a wavelength sensitive power monitoring device connected to receive an output of the crossing waveguide to make per-wavelength power measurements; and
a power measurement processor adapted to process the power measurements to produce information for each of said plurality of waveguides;
wherein the power measurement processor is adapted to determine a total power incoming from each of the plurality of waveguides according to a wavelength map of incoming wavelengths to this particular waveguide with an assumption that the sets of incoming wavelengths are non-overlapping.

31. A tap and continue arrangement comprising:
a plurality of waveguides carrying signals to be monitored;
a crossing waveguide that crosses the plurality of waveguides so as to couple a small fraction of each signal to be monitored into the crossing waveguide;
a wavelength sensitive power monitoring device connected to receive an output of the crossing waveguide to make per-wavelength power measurements; and
a power measurement processor adapted to process the power measurements to produce information for each of said plurality of waveguides;
wherein the power measurement processor is adapted to determine a power per wavelength for each wavelength corresponding to a particular waveguide of the plurality of waveguides according to a wavelength map of incoming wavelengths to this waveguide with an assumption that the sets of incoming wavelengths are non-overlapping.

32. A method of performing optical performance monitoring comprising the following steps:
(a) receiving a plurality of monitoring components;
(b) combining the monitoring components into a combined monitoring signal;
(c) determining a power measurement per wavelength of the combined monitoring signal; and
(d) processing the power measurements to produce per-monitoring component information;

wherein step (d) comprises determining a total power in particular monitoring component according to a wavelength map of incoming wavelengths to this particular monitoring component with an assumption that the sets of incoming wavelengths are non-overlapping.

33. The method of claim 32, further comprising: generating at least one feedback signal as a function of the total power determined for a given monitoring component.

34. The method of claim 32, wherein step (d) further comprises for at least one monitoring component, determining a power per wavelength for each wavelength corresponding to the monitoring component according to a wavelength map of incoming wavelengths to the monitoring component with an assumption that the sets of incoming wavelengths are non-overlapping.

35. The method of claim 32, wherein step (d) further comprises generating at least one feedback signal as a function of at least one of the total powers; and for at least one monitoring component, determining a power per wavelength for each wavelength corresponding to the monitoring component according to a wavelength map of incoming wavelengths to the monitoring port with an assumption that the sets of incoming wavelengths are non-overlapping, and generating at least one feedback signal as a function of at least one of the per wavelength powers determined.

36. The method of claim 32 wherein at least one of the optical monitoring components can be turned on and off.

37. A method of performing optical performance monitoring comprising the following steps:
(a) receiving a plurality of monitoring components;
(b) combining the monitoring components into a combined monitoring signal;
(c) determining a power measurement per wavelength of the combined monitoring signal; and
(d) processing the power measurements to produce per-monitoring component information;
wherein step (d) comprises determining a power per wavelength for each wavelength corresponding to a particular monitoring component according to a wavelength map of incoming wavelengths to this particular monitoring component with an assumption that the sets of incoming wavelengths are non-overlapping.

38. The method of claim 37 further comprising: generating at least one feedback signal as a function of the per wavelength power determined for a given monitoring component.

39. A method of performing optical performance monitoring comprising the following steps:
(a) receiving a plurality of monitoring components;
(b) combining the monitoring components into a combined monitoring signal;
(c) determining a power measurement per wavelength of the combined monitoring signal; and
(d) processing the power measurements to produce per-monitoring component information;
wherein step (b) comprises applying a set of combiner's ratios to the monitoring components, and the processing takes into account the combiner's ratios in producing the per-monitoring component information.

* * * * *